Figure 1:
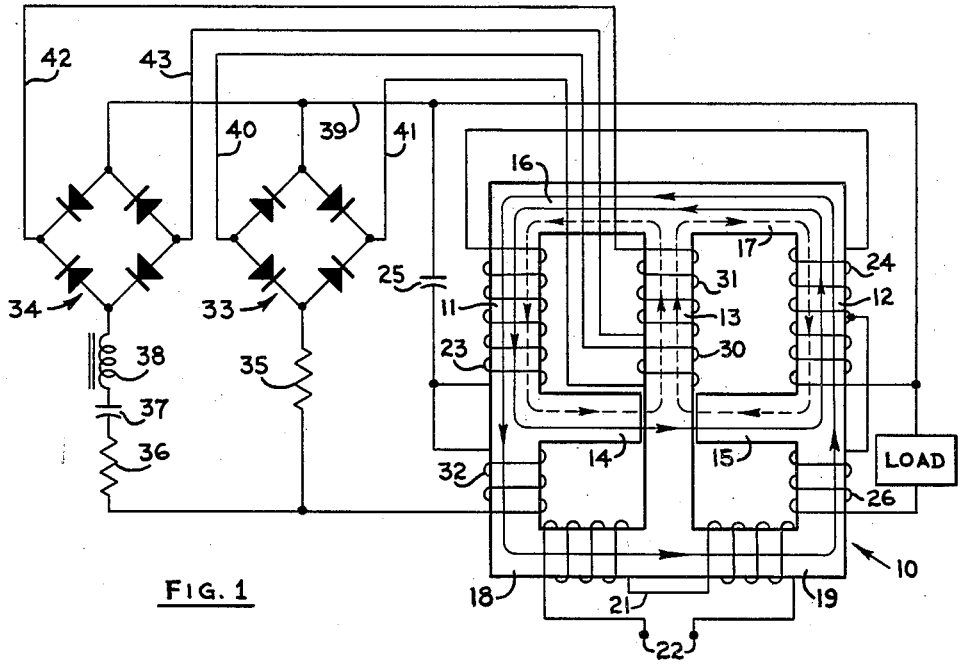

Jan. 15, 1957  F. C. DEAL  2,777,987
VOLTAGE REGULATOR COMPENSATING VOLTAGE AND
FREQUENCY CHANGES
Filed Jan. 13, 1954

INVENTOR.
FOREST C. DEAL
BY
ATTYS.

2,777,987

VOLTAGE REGULATOR COMPENSATING VOLTAGE AND FREQUENCY CHANGES

Forest C. Deal, Indianapolis, Ind.

Application January 13, 1954, Serial No. 403,948

4 Claims. (Cl. 323—56)

(Granted under Title 35, U. S. Code (1952), sec. 266)

The invention described herein may be manufactured and used by or for the Government of the United States of America for governmental purposes without the payment of any royalties thereon or therefor.

This invention relates to voltage regulators and more particularly to voltage regulation of an alternating current voltage output to a load where the supply line voltage and the supply line frequency vary.

There are a number of well known alternating current voltage regulators capable of regulating the output voltage for constant voltage where the input voltage varies. One good example of such a voltage regulator is the leakage reactance transformer wherein large changes in input voltage cause slight changes in the output voltage which are compensated by a small compensating coil to the load. The changes in output voltages resulting from the changes in frequency of the input voltage are not regulated or compensated in the leakage reactance transformer type regulator which, for applications requiring accurate voltage regulation, is inadequate as a voltage regulator for precision use. The advantage of providing a voltage regulator from a leakage reactance transformer is that the use of moving parts or elements relying on the ionization of gases may be avoided whereby friction in mechanical elements and changes in circuit constants through electronic tubes will not have to be accounted for or compensated by occasional readjustments.

In the present invention a leakage reactance transformer and a saturable reactor are combined and modified to provide a regulated output voltage when either the line voltage or the frequency of the line voltage varies. The advantages of the leakage reactance transformer are thus retained and a transformation of the average or intended input voltage may be chosen at the output, as desired, in the use of this invention. The primary and secondary coils as well as the voltage compensating coil to the load of the leakage reactance transformer voltage regulator are retained in the present voltage regulator but are positioned in the legs of the transformer core as desired or as necessity requires to carry out the invention. In one modification an exciting coil and a control coil are positioned on the central core leg and a frequency responsive circuit, the reactance of which decreases with increased frequency or the reactance of which increases with decreased frequency, is coupled to the control coil through a full wave rectifier. The control coil and the frequency responsive circuit are connected across the secondary coil or winding and a second compensating coil used in relation with the frequency compensating circuit. The compensating coil to the load constituting a part of the leakage reactance transformer voltage regulator would alone provide for voltage regulation of input voltage changes if the input frequency remains constant. As the frequency of the input voltage changes, taking for example an increase in frequency, the voltage across the secondary coil or winding increases. The increase in frequency also causes a decrease in reactance in the frequency responsive circuit causing a higher current flow in the control coil which produces additional flux through part of the secondary coil which results in a reduction in voltage across the secondary coil or winding to the amount produced by the change in frequency.

Another modification of the invention uses the second compenusating coil and the secondary coil serially connected to a frequency responsive circuit having a control winding of a saturable reactor therein. When the frequency responsive circuit decreases in reactance upon increase in frequency the current in the control winding is caused to increase thereby decreasing the inductive reactance to maintain the inductive and capacitive reactance relationship in the circuit through the secondary winding constant. It is therefore a general object of this invention to provide an alternating current voltage regulator for controlling the regulator output voltage to a load where the frequency of the regulator input voltage changes and/or the voltage at the regulator input voltage supply varies.

Figure 2:
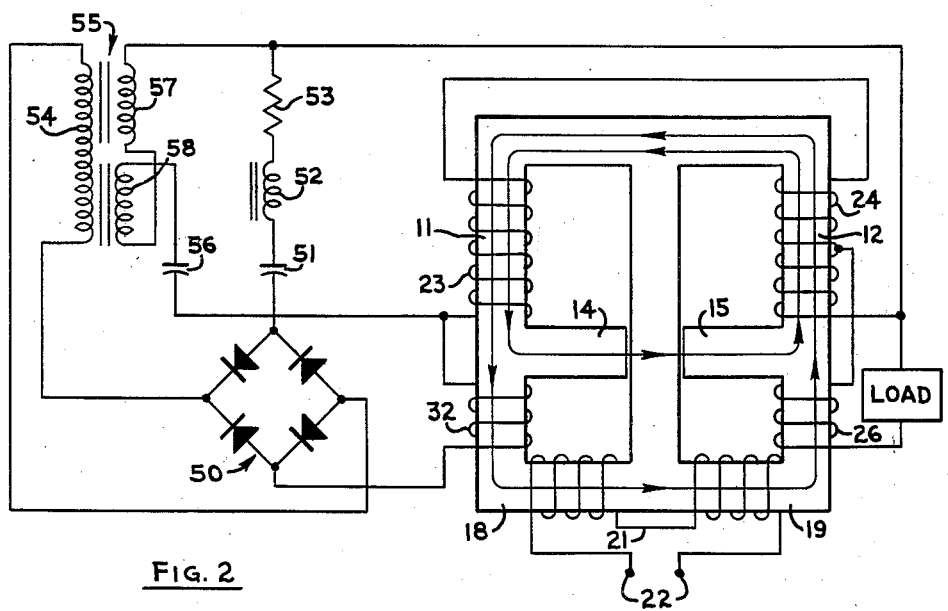

These and other objects, advantages, features, and uses, will become more apparent as the description proceeds when taken in consideration with the accompanying drawing, in which:

Figure 1 illustrates one form of the invention with the circuitry diagrammatically shown, and Figure 2 illustrates a modified form of the invention.

Referring more particularly to Figure 1, there is shown a leakage reactance type transformer core 10 having two outer legs 11 and 12, a central leg 13, and shunting legs 14 and 15. Joining the leg portions 11, 12, and 13 are integral core portions 16 and 17 at the top and integral core positions 18 and 19 at the bottom.

On the core portions 18 and 19 are serially connected primary windings or coils generally referred to herein by the reference character 21. The alternating current supply lines or input leads are connected to the terminals 22 of the primary windings in the ordinary manner. The secondary is comprised of two coils or windings 23 and 24 serially connected on the legs 11 and 12, respectively, through a tuning condenser 25 forming a tank circuit in a manner well known in the art. A voltage compensating coil 26 of few turns on the leg 12 between the shunt 15 and the core portion 19 has one lead connected to a load and the other lead tapped on the secondary coil or winding 24 at a position to provide the desirable output voltage. One end lead of the secondary winding 24 is connected to the load supply line such that the coil 26 is in compensating relation with the section of the secondary winding 24 in circuit with the load.

The structure just described provides what is generally recognized as the leakage reactance transformer voltage regulator wherein voltage changes at the supply input produce proportional changes in the flux in the core elements 18 and 19 which in turn produce changes in flux in the core elements 11, 12, 14, 15, 16 and 17 of a much smaller magnitude which produce corresponding proportional voltage changes in the secondary 23—24. The function of the coil 26 is to provide a voltage change which is equal and opposite to the voltage change in the secondary windings resulting from a voltage change in the primary windings. By properly relating the turns of coils 26 and 23—24, the output voltage can be held substantially constant for voltage variations in the primary windings 21. Any frequency changes in the input supply, however, will cause voltage changes in the output to the load which are not compensated for in any way.

In order to regulate the output voltage for changes in frequency at the input, a frequency sensitive circuit and its control circuit is constructed. On the central leg 13 of the core member 10 are placed two coils or windings, a biasing coil 30 of few turns and a control winding 31 of relatively more turns. A coil or winding 32 on the leg 11 of core 10 between the shunt 14 and the core portion 18 has one of its leads connected to one of the leads, preferably the nearer, of the secondary coil section 23.

The coil 32 is wound in the reverse direction to that of coil 23 for the same purpose that the coil 26 is wound in reverse direction to that of coil 24. The other lead of the coil 32 is connected to two full wave rectifiers 33 and 34 in parallel, the rectifier 33 being connected through the resistor 35 and the rectifier 34 being connected through the resistor 36, a condenser 37, and an induction coil 38. The condenser 37 and the induction coil 38 provide a series resonant circuit the function of which will become clearer as the description proceeds. The returning alternating current circuit of the rectifiers 33 and 34 is through lead 39 to the secondary windings 23—24. The rectified output of the rectifier 33 is through leads 40, 41 to the biasing coil 30 and the rectified output of the rectifier 34 is through leads 42, 43 to the control coil 31.

In the operation of the device as shown in Figure 1, a large change in voltage at the supply terminals 22 produces a slight change in voltage in the secondary 23—24. The compensating coil 26 controls the output voltage to the load as set forth above in the description of the known leakage reactance voltage regulators to hold the output voltage at a predetermined value. The coil 32 likewise helps to regulate the voltage across the secondary windings 23—24. Voltage changes alone in the input supply are therefore regulated to constant voltage output by the coil 26 and the secondary windings 23—24.

It is to be understood that the secondary winding, as 23—24, in leakage reactance type transformers operates in very high flux densities. Therefore, an increase in frequency on the primary windings 21 will cause an increase in voltage on the secondary windings 23—24. Before any frequency increase there exists a definite relation between the reactance of the condenser 25 and the reactance of the secondary winding 23—24, but as the frequency increases the reactance of the condenser 25 will decrease whereas the reactance of the secondary windings 23—24 will increase. By causing a change in the inductive reactance of the secondary winding circuit to maintain the definite relation between the capacitive reactance and the inductive reactance, the voltage across the secondary windings 23—24 will remain substantially constant. Changes in frequency in the input supply at 22 will produce changes in voltage at the load; that is, an increase in frequency at 22 will produce a voltage increase at the load, and vice versa. The circuit 37—38 is so tuned that when the frequency increases the reactance therein decreases causing a larger current to flow therethrough and consequently causes a larger direct current to flow through the control coil 31. The greater current flow in the control coil 31 produces a greater flux in the flux paths shown by dotted lines, the arrows being illustrative only. The arrows on the solid line flux paths are illustrative of the direction of the flux at one instant, it being understood that these solid flux lines change direction each half cycle of the input frequency. The increased flux resulting from the increased direct current in the coil 31 decreases the reactance of the secondary windings 23—24 to the amount exactly offsetting the voltage increase as a result of increased frequency whereby the voltage at the output is made constant during any increases in frequency. A reduction in frequency will, in the reverse manner, increase the reactance in the turned circuit 37—38 to decrease the current to coil 31 increasing the reactance of the secondary windings 23—24 to the amount offsetting the voltage drop normally caused by frequency drop. The value of the resistances 35 and 36, the relative turns in the several windings or coils, and the tuning of the circuit 37—38 with respect to the secondary winding saturable curve are all correlated to produce voltage regulation for the desired voltage inputs and outputs since in the present device the voltage from a supply line can be both transformed and regulated. It may now be apparent that legs 11 and 12 and the secondary windings 23—24 operate as a variable reactor in the secondary winding circuit.

The modification illustrated in Figure 2 shows another construction capable of producing the results of the device of Figure 1. Like parts are represented by like reference characters. The lower lead of the coil 32 is connected to a rectifier 50 with the return circuit through a condenser 51, an inductance coil 52, a resistor 53, to the secondary windings 23—24. The rectified output of the rectifier 50 is through a coil or winding 54 of a saturable reactor 55. The secondary windings 23—24 are connected through a tuning condenser 56 and two coils 57 and 58 in the saturable reactor 55.

In the operation of the device illustrated in Figure 2 an increase in frequency in the primary windings 21 will produce an increase in reactance increasing the voltage in the secondary windings 23—24 in the same manner as described for Figure 1. The combination of the condenser 56 and the induction coils 57 and 58 is capacitive. There exists a definite relation between the capacitive reactance of the combined elements 56, 57, and 58 to the inductive reactance of the secondary windings 23—24 before any frequency change in the primary windings 21. The elements 51—52 provide a series resonant circuit which is so tuned, as in the illustration of Figure 1, to produce a decrease in reactance upon an increase in frequency. An increase in frequency at the input terminals 22 causing a decrease in reactance of the resonant circuit 51—52 produces an increase in control current through the coil 54 of the saturable reactor 55 which in turn causes a decrease in reactance of the saturable reactor 55, which in turn increases the capacitive reactance of the combined elements 56, 57, and 58. The capacitive reactance of the combined elements 56, 57, and 58 continues to increase until the definite relation of the capacitive reactance between the combined elements and the inductive reactance of the secondary windings 23—24 is re-established causing a regulated voltage to the load. In the reverse manner the induced voltage at the output will be augmented by an amount which a reduction in frequency tends to decrease the output voltage.

Compensation in the regulator output voltage for voltage changes in the input supply are provided by the coils 26 and 32 in Figure 2 in the same manner as in Figure 1.

While many modifications and changes may be made in the constructional details and features of this invention without departing from the spirit and scope thereof, I desire to be limited in my invention only by the scope of the appended claims.

What I claim is new and desire to secure by Letters Patents is:

1. A voltage regulating device including a leakage reactance transformer having a primary winding, a secondary winding, and a voltage compensating winding coupled to said secondary winding, the invention which comprises; a low-turn winding on said leakage reactance transformer wound in reverse to said secondary winding; full wave rectification means having rectified output; a series resonant circuit the reactance of which varies inversely with frequency coupled in series to said full wave rectification means, said serially coupled full wave rectification means and said series resonant circuit being coupled in circuit with said low-turn winding supplying the current to be rectified; and a direct current coil coupled to the rectified output of said full wave rectification means and reactively associated with said secondary winding whereby the output voltage remains constant for variations in voltage and frequency in said primary winding.

2. A voltage regulating device including a leakage reactance transformer having a primary winding, a secondary winding, and a voltage compensating winding coupled to said secondary winding, the invention which comprises; a low-turn winding, a direct current control winding, and a biasing winding on the core of said transformer; a pair of rectifiers in circuit with said low-turn winding, one rectifier having its rectified output coupled to said biasing winding and the other rectifier having its rectified output coupled to said direct current control winding; and a series resonant circuit in said circuit of said other rectifier for controlling the reactance in said series resonant circuit controlling the current rectified and impressed on said direct current control winding for controlling, in combination with said biasing winding, the degree of flux saturation in said transformer whereby the voltage output at said secondary winding is constant for voltage and frequency variations in said primary winding.

3. A voltage regulating device including a leakage reactance transformer having a primary winding, a secondary winding, and a voltage compensating winding coupled to the secondary winding, the invention which comprises; a low-turn winding on the core of said transformer; a rectifier and a series resonant circuit serially coupled in circuit with said low-turn winding and said secondary winding; and a saturable reactor having one winding coupled to the rectified output of said rectifier and another winding coupled in circuit with said secondary winding, said series resonant circuit being constructed and arranged to provide a reactance inversely to the frequency of the voltage on the primary windings whereby frequency and voltage changes in the primary winding are regulated in the output voltage of the secondary winding.

4. A voltage regulator including a leakage reactance transformer having a primary winding, a secondary winding, and a voltage compensating winding comprising; a control winding and a low turn winding on the core of said leakage reactance transformer; a full wave rectifier; and a series resonant circuit whose reactance varies inversely with frequency, said full wave rectifier and said series resonant circuit being connected in series with said low turn winding, and said rectifier output being coupled in series with said control winding whereby changes in frequency in said leakage reactance transformer core produce a change in direct current flow through said control winding changing the reactance in said core providing a regulated voltage output.

References Cited in the file of this patent
UNITED STATES PATENTS

| | | |
|---|---|---|
| 2,380,521 | Haug | June 31, 1945 |
| 2,678,419 | Bennett | May 11, 1954 |
| 2,682,632 | Cohen et al. | June 29, 1954 |

FOREIGN PATENTS

| | | |
|---|---|---|
| 612,442 | Great Britain | Nov. 12, 1948 |